US006197174B1

(12) United States Patent
Barber et al.

(10) Patent No.: US 6,197,174 B1
(45) Date of Patent: Mar. 6, 2001

(54) METHOD AND APPARATUS FOR ELECTRODEIONIZATION OF WATER USING MIXED BED AND SINGLE PHASE ION EXCHANGE MATERIALS IN THE DILUTING COMPARTMENT

(75) Inventors: John H. Barber, Fergus; David Florian Tessier, Guelph, both of (CA)

(73) Assignee: E-Cell Corporation, Guelph (CA)

(*) Notice: Subject to any disclaimer, the term of this patent is extended or adjusted under 35 U.S.C. 154(b) by 0 days.

(21) Appl. No.: 09/199,325

(22) Filed: Nov. 25, 1998

(51) Int. Cl.[7] .................................................. B01D 61/44
(52) U.S. Cl. .......................... 204/524; 204/533; 204/536; 204/632
(58) Field of Search .................................. 204/524, 533, 204/536, 632

(56) References Cited

U.S. PATENT DOCUMENTS 5,316,637 * 5/1994 Ganzi et al. ........................ 204/632

FOREIGN PATENT DOCUMENTS

WO 97/34696    9/1997 (WO).

* cited by examiner

Primary Examiner—Arun S. Phasge
(74) Attorney, Agent, or Firm—Arne I. Fors

(57) ABSTRACT

The invention provides a method and apparatus for electrodeionizing water, whereby the water to be purified is passed through diluting compartments in an electrodeionization unit having an anode compartment at one end of the unit and a cathode compartment at the other end of the unit, and a plurality of diluting compartments alternating with concentrating compartments defined by anion and cation exchange membranes. Each of the diluting compartments contains ion exchange material. Importantly, the ion exchange material comprises at least one mixed bed phase of anion exchange material and cation exchange material and at least one single phase, adjacent to the mixed bed phase, of anion exchange material or cation exchange material, or anion exchange and cation exchange material.

43 Claims, 7 Drawing Sheets

METHOD AND APPARATUS FOR ELECTRODEIONIZATION OF WATER USING MIXED BED AND SINGLE PHASE ION EXCHANGE MATERIALS IN THE DILUTING COMPARTMENT

FIELD OF THE INVENTION

The present invention relates to a method and apparatus for electrodeionizing water and, more particularly, to a method and apparatus for improving the efficiency of ion transport within the diluting compartments of an electrodeionization apparatus.

BACKGROUND OF THE INVENTION

It is well-known to deionize water by passing water to be treated through a packed bed of ion exchange resins so that impurity ions are removed as absorbed ions on the ion exchange resin. It is well-known to regenerate the ion exchange resin having its absorbing ability lowered, by means of an acid or alkali. However, a disadvantage of such a method is the discharge of the waste liquid of the acid or alkali used for the regeneration. It is desirable, therefore, to employ a method for producing deionized water which requires no acid or alkali for regeneration. In this respect, attention has been drawn in recent years to a self-regenerating type electrodialytic deionized water producing method wherein ion exchange resins are used in combination with ion exchange membranes, commonly known as electrodeionization. The physical apparatus associated with this method is known as an electrodeionization unit.

The typical electrodeionization unit comprises alternately arranged anion exchange membranes and cation exchange membranes, thereby defining diluting compartments and concentrating compartments. Each of the diluting compartments contains an ion exchange solid composition, comprising both anion exchange and cation exchange solid compositions normally in the form of granules or beads. Water to be purified is passed through the ion exchange granules in diluting compartments.

Anionic impurities in the water are absorbed by the anion exchange solid composition and, under the influence of an applied voltage across the electrodeionization unit, migrate towards and through the anion exchange membrane to enter a first adjacent concentrating compartment for discharge in an aqueous stream flowing therethrough. Similarly, cationic impurities in the water are absorbed by the cation exchange solid composition and migrate towards and through the cation exchange membrane to enter a second adjacent concentrating compartment for discharge in an aqueous stream flowing therethrough.

Typically, the ion exchange solid composition comprises a mixture of cation exchange and anion exchange solid composition beads in a random distribution, more commonly referred to as a "mixed bed" ion exchanger. The mixed bed ion exchange material characteristically has high interfacial contact area between the anion exchange and cation exchange materials contained therein. Such contact area promotes efficient removal of ionic impurities. Further, it facilitates ionization of water molecules. By ionizing water molecules, hydrogen and hydroxyl ions are made available for regeneration of the ion exchange materials. This is particularly critical where the concentration of dissolved ionic impurities in the water to be purified is low, such as near the discharge of the diluting compartment.

Undesirably, where mixed bed ion exchange materials are used, the thickness of the diluting compartment must be necessarily thin. As thickness of the diluting compartment is increased, transport efficiency of impurity ions through the ion exchange solid composition to the membranes is reduced, thereby reducing product water quality. This is because anion exchange material is less likely to be "connected" to the anion exchange membrane by a chain of contiguous anion exchange materials (such attribute hereinafter referred to as "connectivity"). Also, cation exchange material is less likely to be connected to the cation exchange membrane by a chain of contiguous cation exchange material.

Thinner diluting compartments dictate higher manufacturing costs. Further, the effective membrane area increases for thinner diluting compartments, with a concomitant increase in material cost.

U.S. Pat. No. 4,636,296 discloses an electrodeionization unit apparatus which mitigates the above-described connectivity problem with mixed bed ion exchanges in electrodeionization unit diluting chambers. In particular, the electrodeionization unit disclosed therein comprises diluting compartments containing alternating layers of anionic exchange and cationic exchange materials. In this respect, chains of contiguous anion and cation exchange materials are provided for facilitating migration of cationic and anionic impurities respectively. However, such layering of the anion and cation exchange materials reduces interfacial contact between anion and cation exchange materials, thereby reducing removal efficiency with respect to ionic impurities and reducing the rate of ionization of water molecules at a given applied voltage. To this end, the apparatus disclosed in U.S. Pat. No. 4,636,296 relies on regenerant hydrogen and hydroxyl ions produced at the surfaces of the electrodes which, thereafter, migrate into the ion exchange solid composition. However, this approach requires multiple, costly electrodes and introduces complexity which prevents the benefits of a multipolar ionic electrochemical reactor from being realized.

PCT Application No. WO97/34696 discloses an electrodeionization unit apparatus which enhances connectivity of diluting compartment ion exchange materials, including those of the mixed bed variety. This is accomplished by using ion exchange materials wherein a pressure of from 0.1 to 20 $kg/cm^2$ is exerted between the ion exchange materials accommodated in the diluting compartments and the cation exchange membranes and anion exchange membranes defining the diluting compartments, thereby enhancing interfacial contact between individual ion exchange materials. However, where greater internal pressures are exerted between ion exchange materials, void fractions within the diluting compartment decrease, thereby increasing resistance to water flow and reducing the amount of water capable of being treated.

Accordingly, it is desirable to have an arrangement of ion exchange material with improved connectivity and wherein the ion exchange material promotes the efficient ionization of water so that hydrogen and hydroxyl ions are available for regenerating the ion exchange material. Further, it is desirable to improve the connectivity of ion exchange materials which exert an internal pressure of 0.1 to 20 $kg/cm^2$ between themselves.

SUMMARY OF THE INVENTION

In its broad aspect, the present invention provides an electrodeionization unit for deionizing water having an anode compartment at one end of the unit and a cathode compartment at the other end, a plurality of diluting compartments alternating with concentrating compartments between the anode and cathode compartments. Each of the diluting and concentrating compartment are defined by anion and cation exchange membranes. Within each of the diluting compartments, ion exchange material is provided comprising at least one mixed bed phase of anion exchange material and cation exchange material and at least one single phase, adjacent to the mixed bed phase, of anion exchange material or cation exchange material, or anion exchange material and cation exchange material.

In a further aspect of the invention, the at least one single phase can be contiguous and abutting both the anion and cation exchange membranes. Further, the mixed bed phase and the at least one adjacent single phase can be arranged as separate contiguous layers. Where at least one single phase is anion exchange material, the anion exchange material can be contiguous to and abutting the anion and cation exchange membranes. On the other hand, where the at least one single phase is cation exchange material, the cation exchange material can be contiguous to and abutting the cation exchange membrane.

In yet another aspect of the present invention, the at least one single phase can be anion exchange material and cation exchange material in layers and abutting a layer of mixed bed phase therebetween, where the layers of anion exchange material and cation exchange material are contiguous to and abutting the anion exchange membrane and the cation exchange membrane respectively. Each of the layers of anion exchange material and cation exchange material can also be co-extensive with the mixed bed phase layer.

In still yet another aspect of the present invention, the at least one single phase can be a porous and permeable continuous phase and the mixed bed phase can be a porous and permeable dispersed phase in the continous single phase. Alternatively, the mixed bed phase can be a porous and permeable continuous phase and the single phase can be a porous and permeable dispersed phase of clusters in the continuous mixed bed phase.

In another aspect of the present invention, the ion exchange material can be in the form of a shallow bed having opposite planar bed surfaces, and in which the dispersed phase clusters are perpendicular to the planar bed surfaces and are coterminous with at least one of the planar bed surfaces. The dispersed phase clusters can also extend through the shallow bed and conterminous with the opposite planar bed surfaces of the bed.

In yet a further aspect of the present invention, the ion exchange material in the diluting compartments can be under a compaction pressure from 0.1 to 20 kg/cm$^2$.

In a further aspect, the present invention provides a method for deionizing water in an electrodeionization unit having an anode compartment at one end and a cathode compartment at the other end, and a plurality of diluting compartments alternating with concentrating compartments between the anode and cathode compartments. Each of the diluting and concentrating compartments are defined by anion and cation exchange membranes. Further, each of the diluting compartments contain ion exchange material. The ion exchange material comprises at least one mixed bed phase of anion exchange material and cation exchange material and at least one single phase, adjacent to the mixed bed phase, of anion exchange material or cation exchange material, or anion exchange material and cation exchange material. Water to be deionized is passed through the diluting compartments where ion impurities are removed as a result of ion exchange and ion conduction mechanisms within the diluting compartment.

In another aspect of the present invention, a compaction pressure to the ion exchange material of 0.1 to 20 kg/cm$^2$. Preferably, the compaction pressure is 0.5 to 10 kg/cm$^2$, and more preferably 0.8 to 2 kg/cm$^2$. The compaction pressure can be applied by adjusting the volume of the ion exchange material in the free state to 103 to 170 volume % relative to the volume of the diluting compartments, and preferably 111 to 150 volume % relative to the volume of the diluting compartments.

In yet a further aspect, the present invention provides a method of deionizing water in a electrodeionization unit having a anode compartment at one end of the unit and a cathode compartment at the other end of the unit, and a plurality of diluting compartments alternating with concentrating compartments between the anode and cathode compartments. Each of the diluting and concentrating compartments are defined by anion and cation exchange membranes. Further, each of the diluting compartments contain ion exchange material. The ion exchange material comprises at least one mixed bed phase, at least one anion exchange single phase, at least one cation exchange single phase. The anion exchange phase and cation exchange phase are adjacent to the mixed bed phase, on opposite sides thereof. Water to be deionized is passed through the diluting compartments where ion impurities are removed as a result of ion exchange and ion conduction mechanisms within the diluting compartment.

BRIEF DESCRIPTION OF THE DRAWINGS

The method and apparatus of the invention will now be described with reference to the accompanying drawings, in which.

DESCRIPTION OF THE PREFERRED EMBODIMENT

In general, the present invention is applicable to water purification processes which are carried out using an electrodeionization unit.

Figure 1:
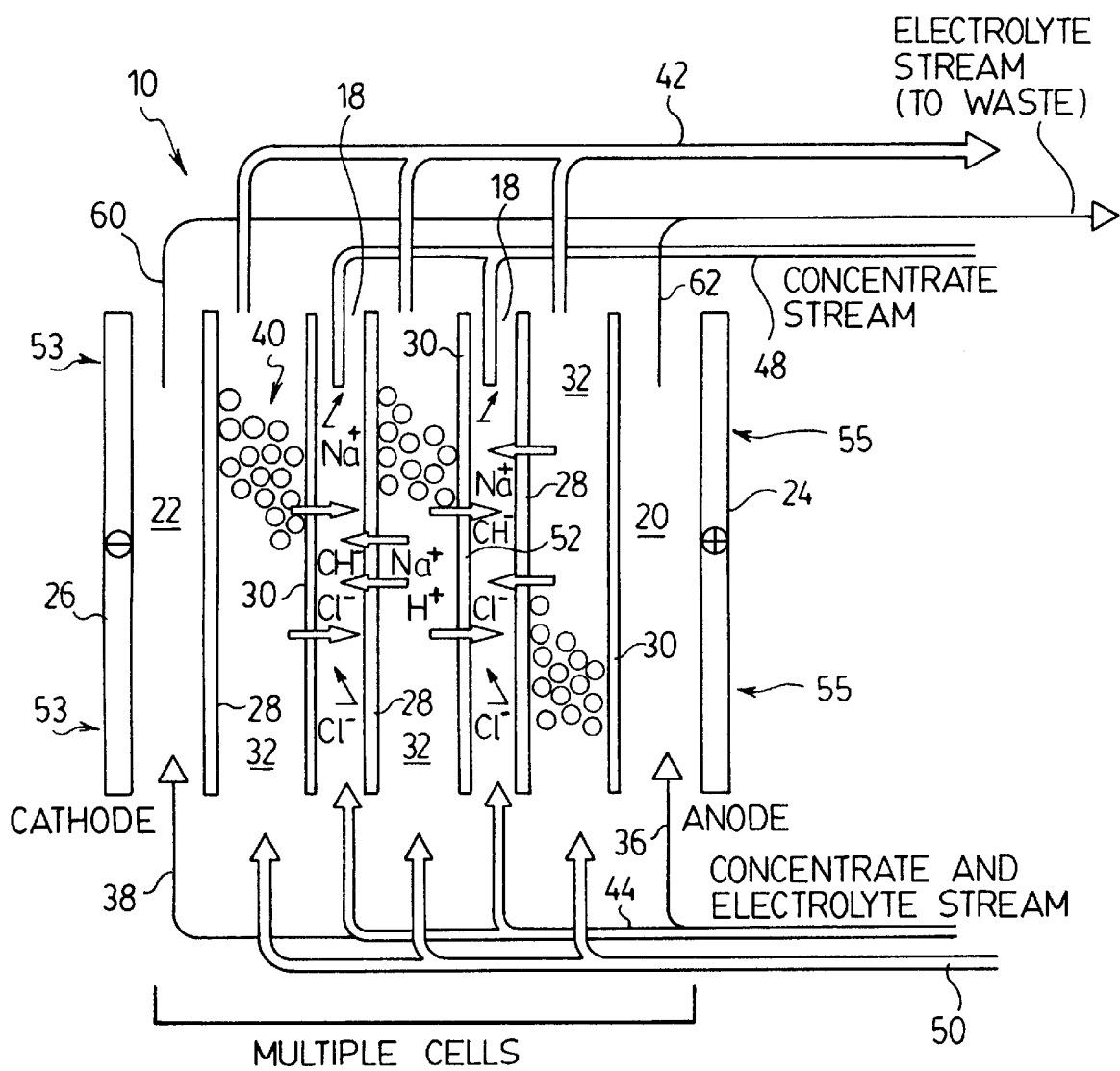
FIG. 1 is a schematic illustration of an electrodeionization unit of the present invention.

Referring first to FIG. 1, the electrodeionization unit 10 in accordance with the present invention comprises the anode compartment 20 provided with an anode 24 and the cathode compartment 22 provided with a cathode 26. A plurality of cation exchange membranes 28 and anion exchange membranes 30 are alternately arranged between the anode compartment 20 and the cathode compartment 22 to form diluting compartments 32 each defined by anion exchange membrane 30 on the anode side and by a cation exchange membrane 28 on the cathode side and concentrating compartments 18 each defined by a cation exchange membrane 28 on the anode side and by an anion exchange membrane 30 on the cathode side. Electrolyte solution is supplied to anode compartment 20 and to cathode compartment 22 via flowstreams 36 and 38 respectively.

Ion exchange material designated by numeral 40 is provided in diluting compartments 32. Such media enhance water purification by removing unwanted ions by ion exchange. Further, such media facilitate migration of ions towards membranes 28 and 30 for subsequent permeation therethrough, as will be described hereinbelow. The ion exchange material 40 can be in the form of an ion exchange resin, an exchange fibre or a formed product thereof.

Water to be treated is introduced into the diluting compartments 32 from supply stream 50. Similarly, water or an aqueous solution is introduced into the concentrating compartments 18 and into the anode and cathode compartments 20, 22 from a supply stream 44. A predetermined electrical voltage is applied between the two electrodes whereby anions in diluting compartments 32 permeate through anion exchange membranes 30 and into concentrating compartments 18 while cations in streams in diluting compartments 32 permeate through cation exchange membranes 28 and into concentrating compartments 18. The above-described migration of anions and cations is further facilitated by the ion exchange material 40 present in diluting compartments 32. In this respect, driven by the applied voltage, cations in diluting compartments 32 migrate through cation exchange resins using ion exchange mechanisms, and eventually pass through cation exchange membranes 28 which are in direct contact with the cation exchange resins. Similarly, anions in diluting compartments 32 migrate through anion exchange resins using ion exchange mechanisms, and eventually pass through anion exchange membranes 30 which are in direct contact with the anion exchange resins. Aqueous solution or water introduced into concentrating compartments 18 from stream 44, and anion and cation species which subsequently migrate into these compartments, are collected and removed as a concentrated solution from discharge stream 48, while a purified water stream is discharged from diluting compartments 32 as discharge stream 42.

The pressure exerted on the ion exchange materials accommodated or packed in the diluting compartments and between the cation exchange membranes and the anion exchange membranes defining the diluting compartments, is adjusted within a range of from 0.1 to 20 $kg/cm^2$ by compacting the ion exchange materials, to be described. If the pressure is less than 0.1 $kg/cm^2$, the physical contact of the ion exchange materials between one another, and between the ion exchange materials and the ion exchange membranes, tends to be inadequate, whereby electrical resistance is likely to increase and/or a short path of water to be treated is likely to form with resulting short-circuiting of water flow. As a result, the purity of the resulting product water tends to be low, such being undesirable. On the other hand, if ion exchange materials are compacted such that the pressure exerted thereon exceeds 20 $kg/cm^2$, the contact of the ion exchange materials between one another, and between the ion exchange materials and the ion exchange membranes will be adequate, but the water flow and the amount of water treated tends to decrease and the ion exchange membranes are likely to be damaged by the high pressure. The pressure accordingly is preferably in the range of 0.5 to 10 $kg/cm^2$, more preferably from 0.8 to 2 $kg/cm^2$.

The pressure exerted on the ion exchange materials packed in the diluting compartments and on the ion exchange membranes preferably is applied in such a manner that the volume of the ion exchange materials to be accommodated in the diluting compartments in their free state is reduced smaller than the volume of their regenerated form by compacting the ion exchange materials in the diluting compartments in an amount to achieve the desired pressure of compaction, followed by supplying water of regeneration and conditioning with an electric current to let the ion exchange material expand to the volume thereby to increase the pressure. Alternatively, the ion exchange material is accommodated in the diluting compartments, and then the volume of the diluting compartments is mechanically reduced to increase the pressure to the desired level. The term "free state", as used herein, means a state wherein the ion exchange material has not physically adapted itself to fit within the confined space of the diluting compartment.

In the first method above, it is preferred that the ion exchange material is packed in the diluting compartments in an amount such that the volume of the ion exchange materials in the regenerated form in a free state would be from 103 to 170% relative to the available volume of the diluting compartments. If this free state amount is less than 103%, the contact between the ion exchange materials tends to be poor. On the other hand, if the free state amount exceeds 170%, the said contact will be good, but the pressure loss in passing water through the ion exchange materials tends to be undesirably high. It is preferred that the free state volume of the ion exchange materials is in the range of 111 to 150% of the volume of the diluting compartments.

For reduction of the volume of the ion exchange material to a level smaller than the volume of its regenerated form, the following methods can be used: (i) water content can be reduced by drying, (ii) a method of changing the counter ion to an ion species for other than the regenerated form to convert the ion exchange material to a loaded form, or (iii) the ion exchange material can be immersed in an organic solvent for solvent substitution. However, use of the method (i) and the method (ii) in combination, is preferred, since they can readily be applied irrespective of the kind or structure of the ion exchange material, and the volume decreasing amount is large.

When the water content is to be reduced by drying, it is preferred to reduce the water content to a level of from 1 to 30 wt %. If the water content is less than 1 wt %, it takes an undesirably long time for drying. If the water content is greater than 30 wt %, the increase of the volume by adding water and conducting an electric current tends to be minimal, such being undesirable. It is preferred that the water content is in the range of about 5 to 15 wt %, whereby drying will be easy, and the volumetric increase by supplying water and conducting an electric current will be large. As to the type of the counter ion during drying, a Na-type is preferred for a cation exchange material, and a Cl-type is preferred to an anion exchange material, since such types are thermally stable compared with the corresponding H and OH types respectively. The drying temperature is preferably from 30 to 80° C. If it is lower than 30° C., it takes an undesirably long time to dry, and if it is higher than 80° C., the ion exchange groups tend to decompose, such being undesirable.

In the case of a method of changing the counter ion to an ion species for other than the regenerated form to convert the ion exchange material to a loaded form, a Na-type is preferred for a cation exchange material, and a Cl-type is preferred for an anion exchange material, as mentioned above. As other ion species, a K-type or a Li-type is preferred for a cation exchange material, and a monovalent counter ion such as a Br-type or $NO_3$-type is preferred for an anion exchange material. In this respect, a Ca-type or an Al-type, or bivalent or higher valent counter ion such as a $SO_4$-type, is not preferred, since the conversion to a regenerated form tends to be difficult.

In the above-mentioned method wherein the ion exchange materials are packed in the diluting compartments, and then the volume of the diluting compartments is mechanically reduced to increase the pressure, it is preferred to interpose a spacer which is compressible by pressure between diluting compartment frames and the ion exchange membranes, and to exert pressure from outside perpendicular to the plane of the spacer, as depicted by arrows 53, 55 in FIG. 1, to compress the spacer after packing the ion exchange materials, so that the volume of the diluting compartments is reduced by from 5 to 60 vol %. If the reduced volume of the diluting compartments is less than 5 vol %, the contact of the accommodated ion exchange materials tends to be poor. On the other hand, if the reduced volume of the diluting compartments exceeds 60 vol %, the contact will be good, but the pressure loss due to resistance when water is passed through the ion exchange material tends to be high, such being undesirable. As the material for such shrinkable spacer, a foam sheet of e.g. polyethylene, polypropylene or polystyrene, is preferably employed.

Figure 2:
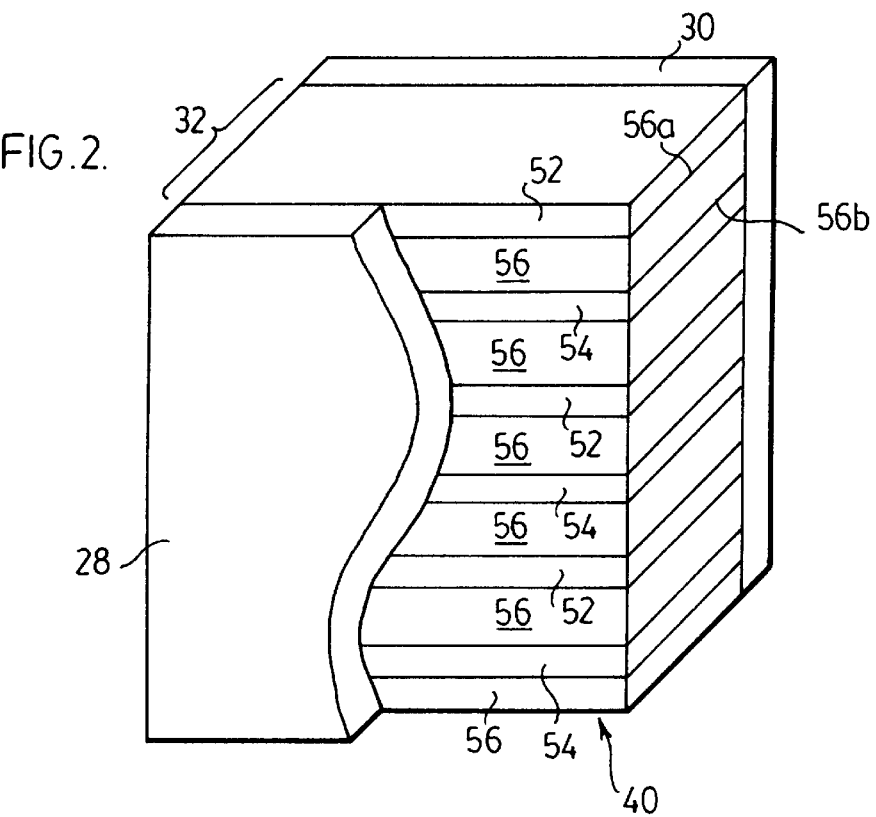
FIG. 2 is a perspective view, partly cut away, of an arrangement of ion exchange material of the present invention.

FIG. 2 shows a preferred arrangement of ion exchange material 40 of the present invention to be used within diluting compartments 32. In this first embodiment, ion exchange material 40 comprises alternating layers of an anion exchange phase 52, a "mixed bed" ion exchange phase 56, and a cation exchange phase 54, such layers arranged substantially transverse to the flow direction of the stream in diluting compartments 32. The term "mixed bed" ion exchange material, as the term is used herein, refers to ion exchange material comprising both anion exchange material and cation exchange material, randomly distributed throughout the mixed bed volume, wherein the volume fraction of anion exchange material is within the range of 20 vol % to 80 vol % and the volume fraction of the cation exchange material is within the range of 80 vol % to 20 vol %.

Under the influence of an applied voltage, and by virtue of the high interfacial contact between anion exchange material and cation exchange material therein, the mixed bed phase 56 promotes efficient removal of ionic impurities. Further, the mixed bed phase 56 facilitates the ionization of water molecules into hydrogen and hydroxyl ions for regeneration of anion and cation exchange material in the mixed bed phase 56 as well as in the anion exchange phase 52 and cation exchange phase 54. Such regeneration is particularly beneficial in regions where the concentration of ions in a stream flowing through a diluting compartment 32 is relatively low and, by themselves are insufficient to sustain the applied current at a sufficiently high level for effective deionization of the stream flowing through the diluting compartment 32.

To improve connectivity of anion exchange material and cation exchange material of the mixed bed phase 56 with the anion exchange membranes 30 and cation exchange membranes 28 respectively, each layer of mixed bed phase 56 is disposed between a layer of anion exchange phase 52 on one surface 56a and a layer of cation exchange phase 54 on the other surface 56b. In this respect, anion exchange phase 52 is contiguous with anion exchange matter at the surface 56a of mixed bed phase 56 and, therefore, provides connection of such anion exchange matter at surface 56a with anion exchange membrane 30. Similarly, cation exchange material 54 is contiguous to cation exchange matter at the surface 56b of mixed bed phase 56 and, therefore, provides connection of such cation exchange matter at surface 56a with cation exchange membrane 28. Such connections, in both cases, facilitate migration of anions and cations through combined ion exchange and ion conduction mechanisms from within flow regions in the void spaces of the mixed bed phase 56 to the anion exchange membrane 30 and cation exchange membrane 28 respectively.

Figure 3:
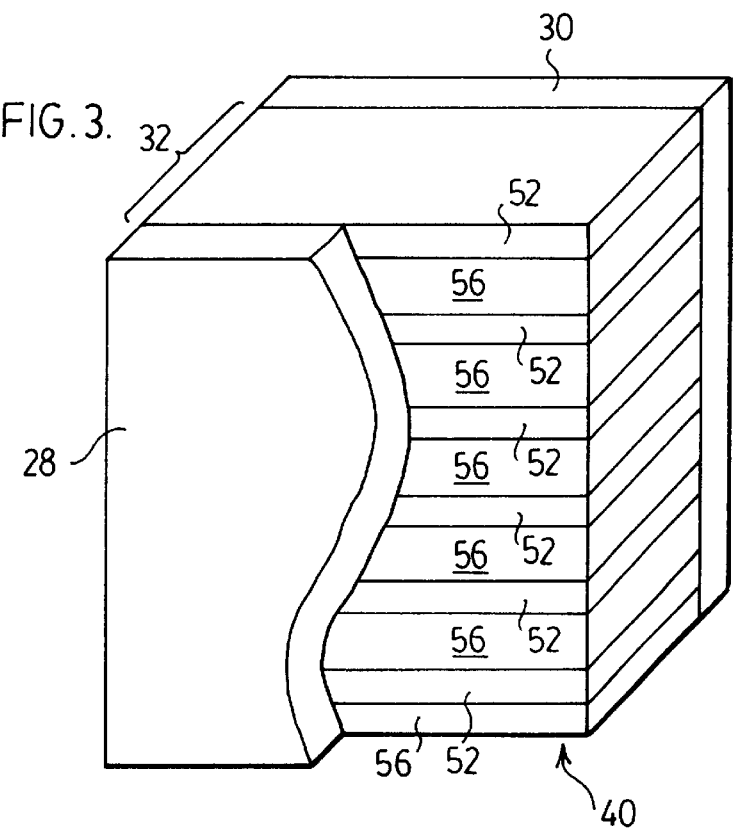
FIG. 3 is a perspective view, partly cut away, of a second arrangement of ion exchange material of the present invention.

FIG. 3 shows another embodiment of the arrangement of ion exchange material 40 of the present invention wherein the ion exchange material 40 is comprised of alternating layers of anion exchange phase 52 and mixed bed phase 56. This arrangement improves the connectivity of the anion exchange matter in the mixed bed ion exchange material. As a result, it enhances the removal of simple anions and of, importantly, weakly ionized basic inorganic contaminants such as reactive silica, carbon dioxide, boron in the form of boric acid, and weakly acidic organic contaminants such as carbonylic acids and phenols. Preferably, this arrangement is used in a region of a diluting compartment 32 in an electrodeionization wherein the bulk of cationic impurities have already been removed in an upstream device or in an upstream region of the same diluting compartment 32, and it is desired to remove residual weakly ionized anionic impurities.

Figure 4:
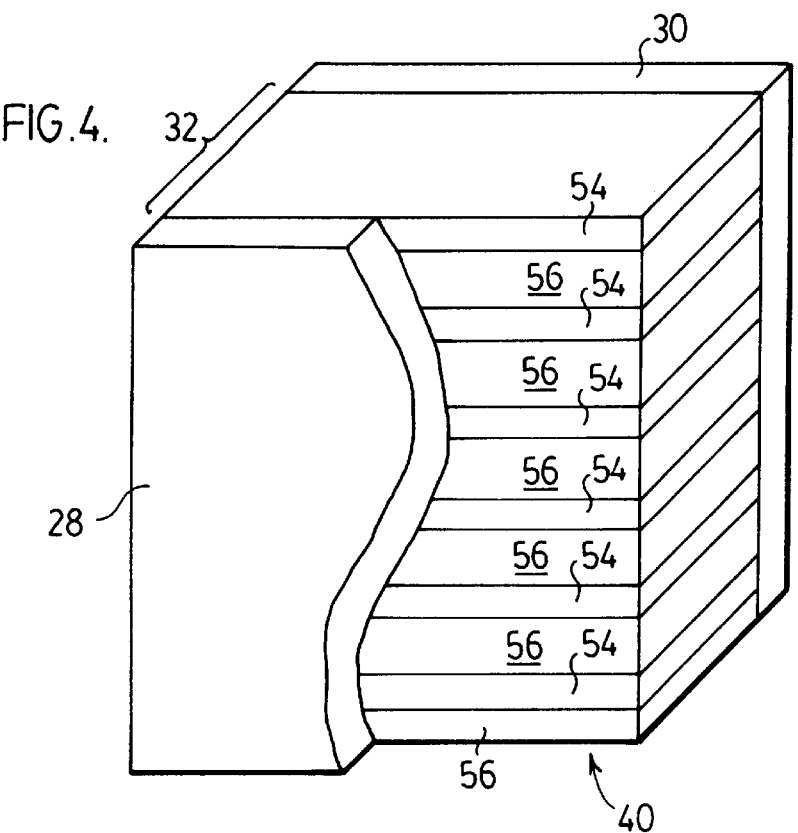
FIG. 4 is a perspective view, partly cut away, of a third arrangement of ion exchange material of the present invention.

Referring to FIG. 4, another arrangement of the ion exchange material 40 of the present invention is illustrated wherein the ion exchange material 40 is comprised of alternating layers of cation exchange phase 54 and mixed bed phase 56. Such arrangement enhances the removal of cations and weakly ionized cationic materials, such as ammonia, amines, and hydrazine, by improving the connectivity of cation exchange matter of the mixed bed phase 56 with the cation exchange membrane 28.

The embodiments illustrated in FIGS. 2, 3 and 4 depict composite layers of ion exchange material 40, namely layers of anion exchange materials 52 and/or cation exchange materials 54 with layers of mixed bed ion exchange materials 56, with substantially planar surfaces. It is not essential that such surfaces are substantially planar.

Figure 5:
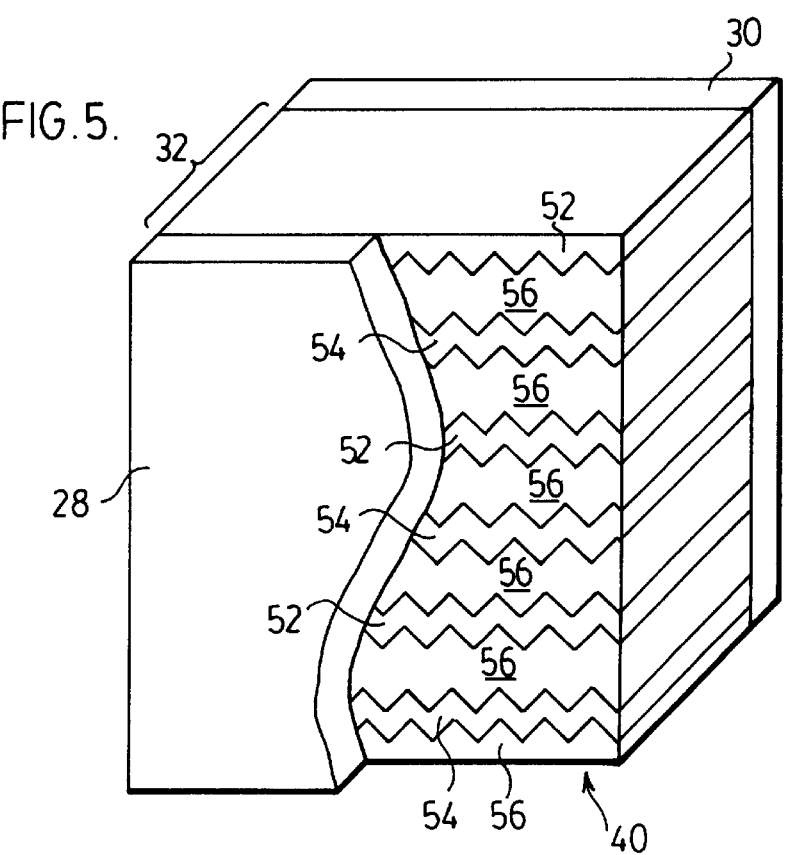
FIG. 5 is a perspective view, partly cut away, of a fourth arrangement of ion exchange material of the present invention.
Figure 6:
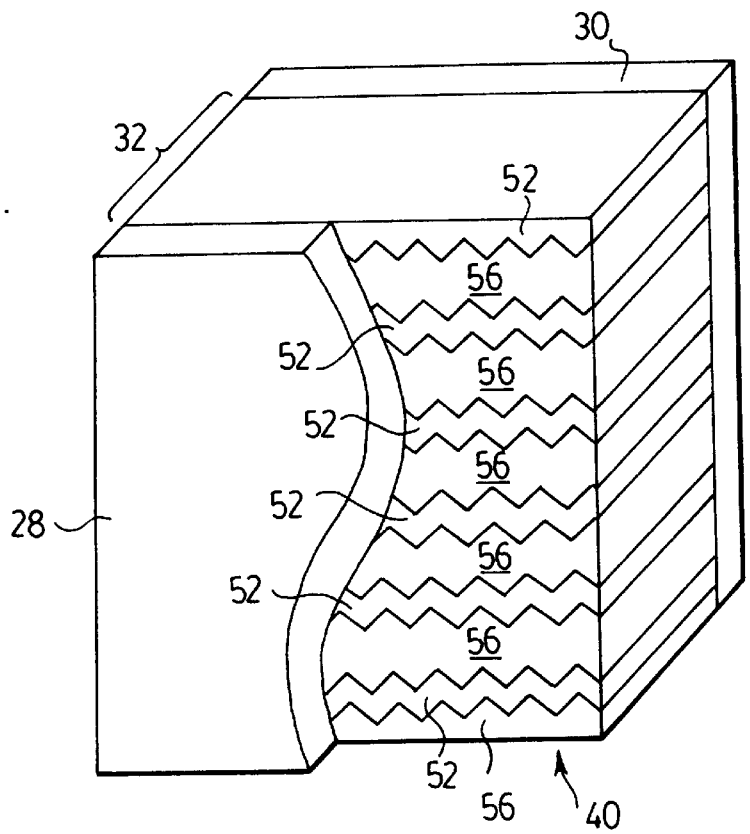
FIG. 6 is a perspective view, partly cut away, of a fifth arrangement of ion exchange material of the present invention.
Figure 7:
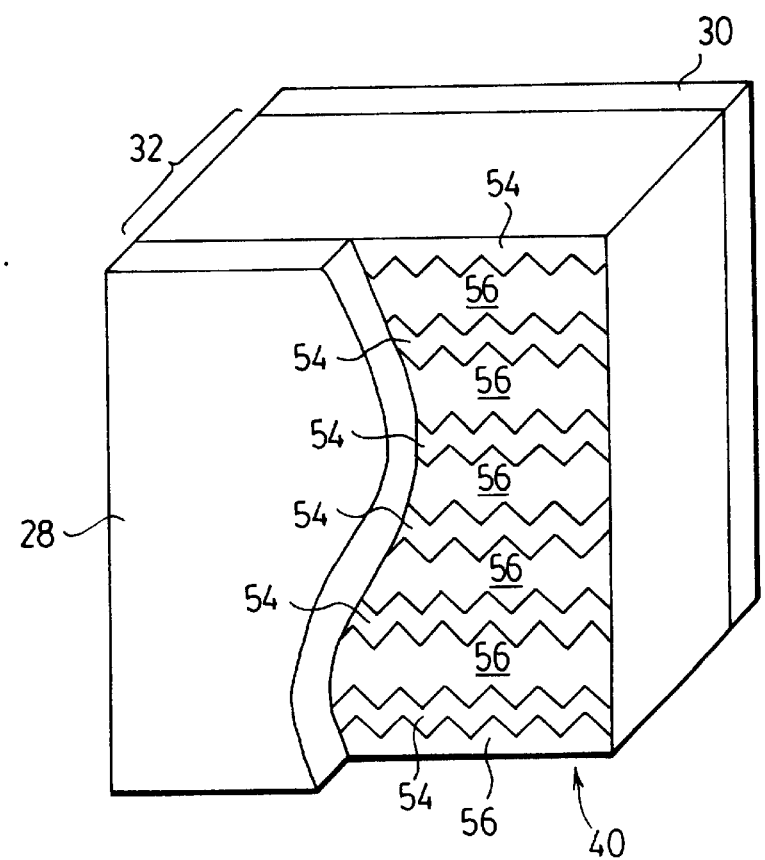
FIG. 7 is a perspective view, partly cut away, of a sixth arrangement of ion exchange material of the present invention.

FIGS. 5, 6 and 7 show a further embodiment wherein such layers of ion exchange material 40 are zigzagged, i.e. corrugated, to provide greater interfacial area between adjacent layers than with planar layers.

The anion exchange phase 52, cation exchange phase 54 and mixed bed phase 56 of the above embodiments can be in the form of an ion exchange resin, an ion exchange fibre or a formed product thereof, but must be porous and be permeable to the flow of liquid therethrough. The formed product can comprise of ion exchange resin particles bound to each other by means of a binder polymer.

Figure 8:
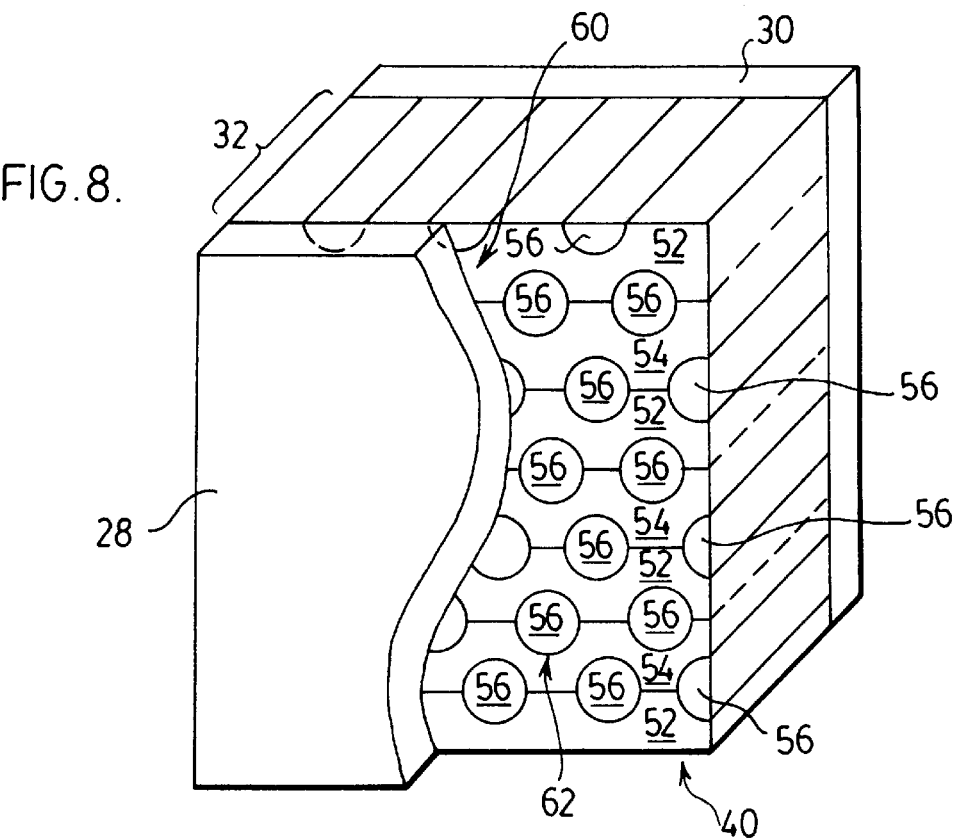
FIG. 8 is a perspective view, partly cut away, of a seventh arrangement of ion exchange material of the present invention.

Referring now to FIG. 8, in accordance with another embodiment of the present invention the ion exchange material can comprise of a bed of porous and permeable continuous matrix of a first ion exchange material 60 with a plurality of spaced-apart cylinders of porous and permeable clusters 62 of a mixed bed phase 56 dispersed within matrix 58 transversely of the bed plane. The first ion exchange material 60 is comprised of alternating anion exchange phase 52 and cation exchange phase 54. Such arrangement improves the removal of anions and cations from within the diluting compartments 32.

Figure 9:
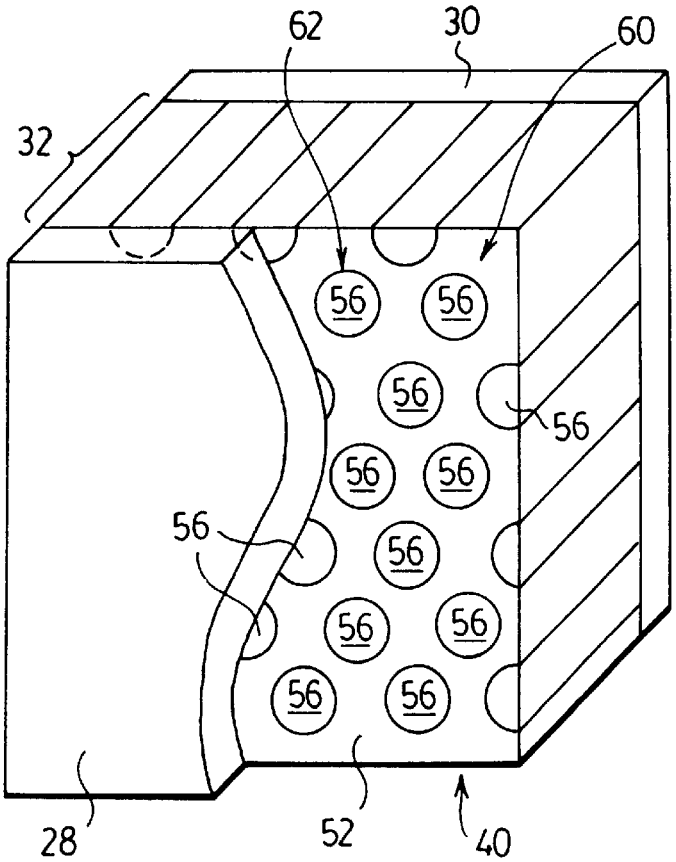
FIG. 9 is a perspective view, partly cut away, of an eighth arrangement of ion exchange material of the present invention.
Figure 10:
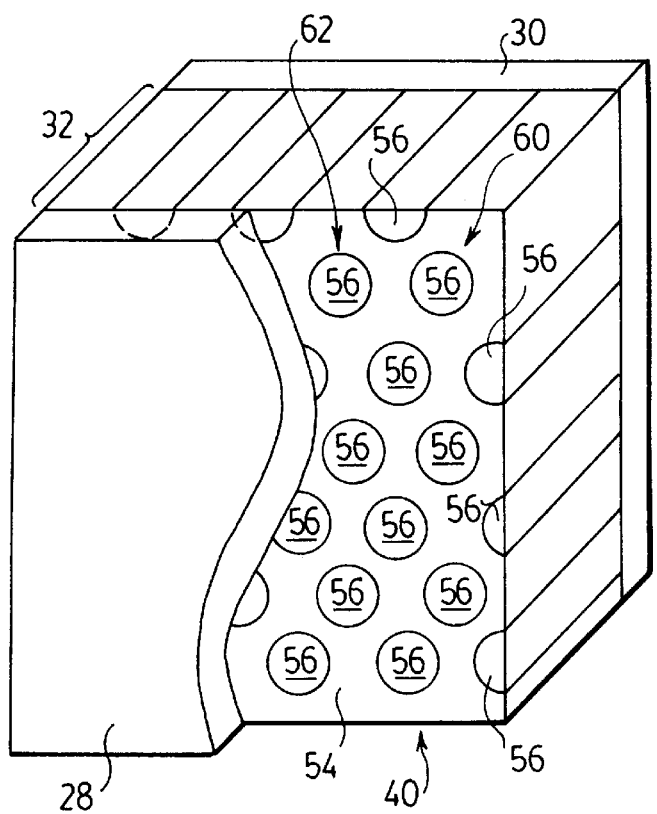
FIG. 10 is a perspective view, partly cut away, of a ninth arrangement of ion exchange material of the present invention.

Alternatively, and as illustrated in FIGS. 9 and 10, the first ion exchange material 60 of the continuous matrix can comprise of either of anion exchange phase 52 or cation exchange phase 54. In this respect, the former arrangement improves the removal of anions from the diluting compartments 32, while the latter arrangement improves the removal of cations from the diluting compartments 32.

Figure 11:
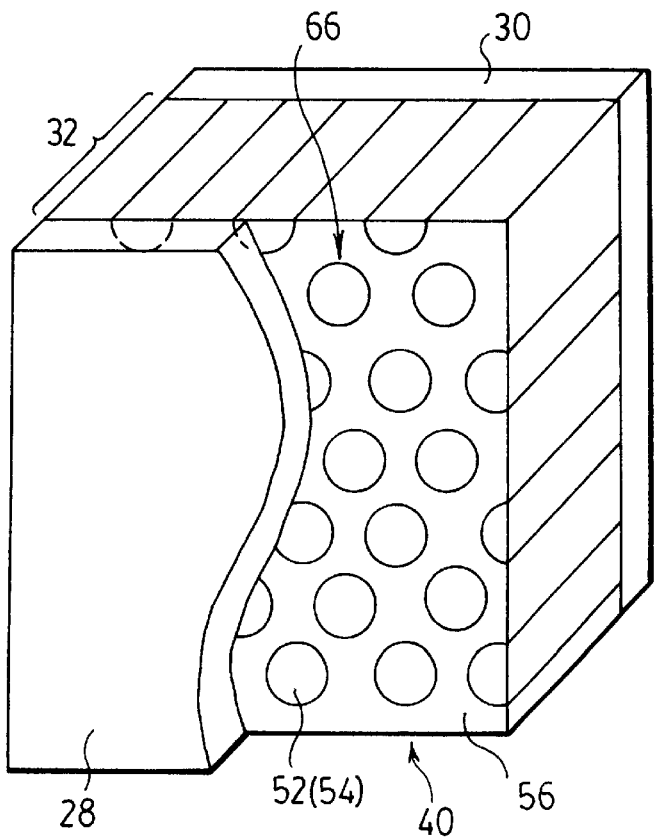
FIG. 11 is a perspective view, partly cut away, of a tenth arrangement of ion exchange material of the present invention.

As a further alternative embodiment, as illustrated in FIG. 11, the ion exchange material 40 may comprise of a bed of porous and permeable matrix of mixed bed phase 56, with a plurality of spaced-apart cylinders of porous and permeable clusters 66 of a single phase second ion exchange material dispersed within matrix 58 transversely of the bed plane. The second ion exchange material can comprise of either anion exchange phase 52 or cation exchange phase 54.

The clusters 62 or 66 can be formed from a shallow bed or sheet of continuous phase of anion exchange materials 52 or cation exchange materials 54 or mixed bed ion exchange materials 56, bonded by a polymeric binder, by die cutting clusters of the desired size and shape from the sheet. A sheet of a continuous phase of ion exchange materials, which are comprised by matrix 60 or 64, bonded by a polymeric resin having a plurality of holes corresponding in size and shape to clusters 62 or 66 die cut therefrom, can receive the cut-out clusters 62 or 66 in tight-fitting frictional arrangement to form ion exchange material 40 for use in embodiments illustrated in either of FIGS. 8, 9, 10 and 11.

Figure 12:
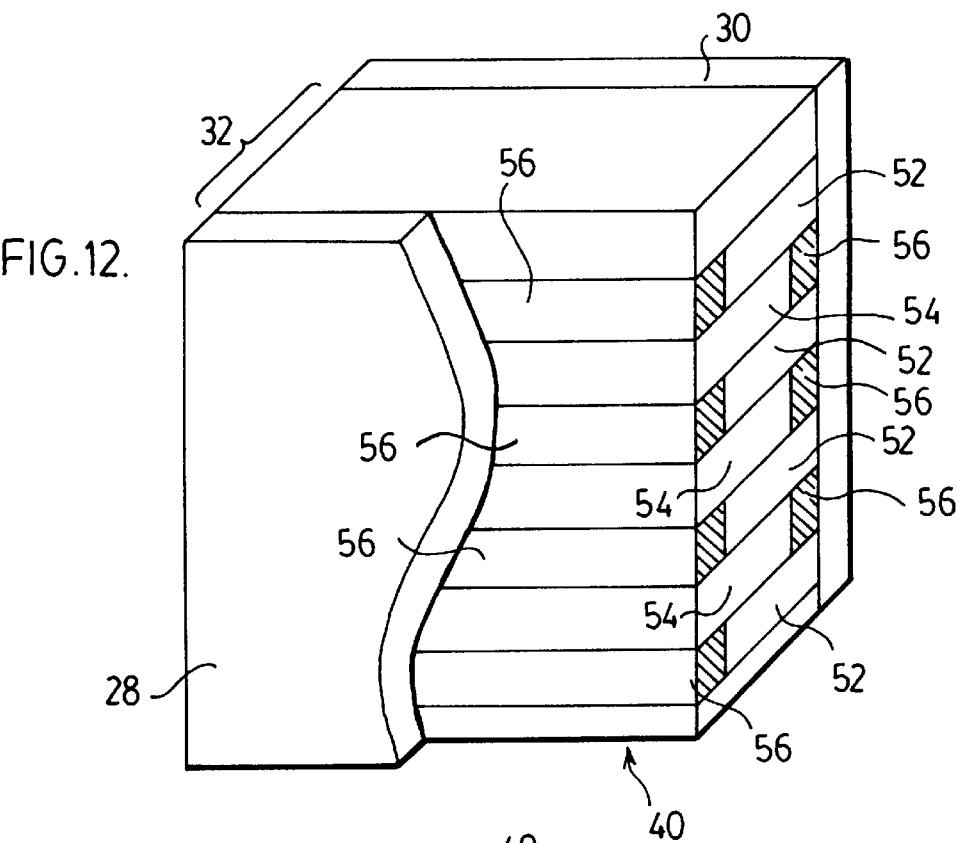
FIG. 12 is a perspective view, partly cut away, of an eleventh arrangement of ion exchange material of the present invention.
Figure 13:
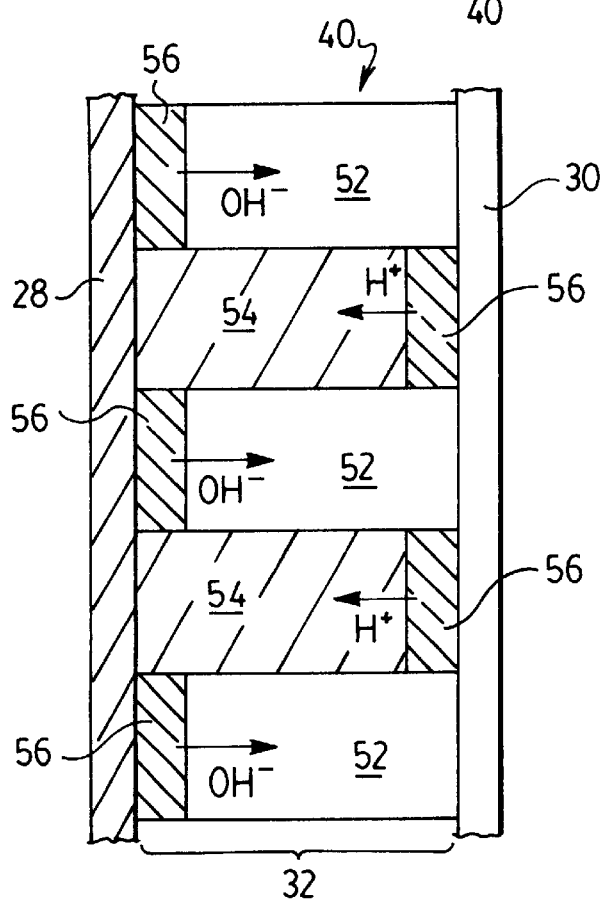
FIG. 13 is a side elevation view of the arrangement of ion exchange material in FIG. 12.

FIGS. 12 and 13 illustrate still further embodiments of the present invention wherein several domains of mixed bed ion exchange materials 56 are disposed within diluting compartment 32 proximate to each of the anion exchange membrane 30 and cation exchange membrane 28. Anion exchange phases 52 and cation exchange phases 54 are also disposed within diluting compartment 32 and adjacent to the domains of mixed bed ion exchange materials.

The method and apparatus of the present invention will now be described with reference to the following non-limitative examples.

EXAMPLE 1

An electrodeionization device (effective area of 507 cm$^2$, comprised of 30 cell pairs of diluting and concentrating compartments, wherein the width of each cell pair was 13 cm and the length of each cell pair was 39 cm, forming a filter press type electrodeionization stack, having concentrating and diluting compartments bounded by a cation exchange membrane (strong acid type heterogeneous membrane, thickness 0.05 cm, ion exchange capacity 4.5 meq/g-dry resin) and an anion exchange membrane (strong base type heterogeneous membrane, thickness 0.05 cm, ion exchange capacity 3.5 meq/g-dry resin) which was arranged and fixed by way of diluting compartment spacer frames (made of polypropylene) and concentrating compartment frames (made of polyolefin) with fused polypropylene support mesh.

The diluting compartments were each packed with an initial layer of cation exchange material, followed by 10 sequences of four layers each consisting of: a) a layer of mixed bed ion exchange material about 0.98 cm thick in the flow direction, b) a layer of an ion exchange material about 1.0 cm thick in the flow direction, c) a layer of mixed bed ion exchange material about 0.98 cm thick in the flow direction, and d) a layer of cation exchange material about 1.0 cm thick in the flow direction. The mixed bed layers in each diluting chamber were comprised of about 70.3 grams (dry ion exchange weight basis) of a 50% by weight mixture of strong base anion and strong acid cation exchange resin. The anion exchange layers in each diluting compartment were comprised of about 49.9 grams (dry anion exchange weight basis) strong base anion exchange resin in the form of a sheet-like product consisting of a mixture of ion exchange resin and an olefinic polymeric binder in a dry state. Similarly, the cation exchange layers in each diluting compartment were comprised of about 71.3 grams (dry cat ion exchange weight basis) of strong acid anion exchange resin in the form of a sheet-like product consisting of a mixture of ion exchange resin and an olefinic polymeric binder in a dry state. The two ion exchange resins were of a sulphonic acid type cation exchange resin (trade name: Diaion SK-1B manufactured by Mitsubishi Chemical Corporation) and a quaternary ammonium salt anion exchange resin (trade name: Diaion SA-10A manufactured by Mitsubishi Chemical Corporation).

By using this electrodeionization device, a test was carried out in the following manner. Feed water to be purified was prepared comprising 17.5 ppm NaCl (about 35 uS/cm conductivity) at 22–24° C. The feed water to be purified was passed through the diluting compartments of the electrodeionization device at a flow rate of about 12.5 gpm and a DC electric current of 4.3 Amps was applied. Under these operating conditions, the resistivity of the product water of the electrodeionization device, corrected to 25° C., was determined to be 17.32 MOhm.cm. This high level of product resistivity indicates effective deionization.

EXAMPLE 2

A comparative experiment was conducted in the manner as in Example 1 described above, with the following exception: the diluting compartments were each packed with 191 grams (dry ion exchange weight basis) of a 50% by weight mixture of strong base anion exchange resin and strong acid strong base resin, of the type described above.

Example 2 was carried out using this electrodeionization device in the following manner. Feed water to be purified was prepared comprising 17.1 ppm NaCl (about 34 uS/cm conductivity) at 22–24° C. The feed water to be purified was passed through the diluting compartments of the electrodeionization device at a flow rate of about 12.5 gpm and a DC electric current of 4.3 Amps was applied. Under these operating conditions, the resistivity of the product water of the electrodeionization device, corrected to 25° C., was determined to be 14.47 Mohm.cm. This level of product resistivity indicates a lower degree of deionization, compared with Example 1.

As indicated in the above Example 1 and Example 2, operation of an electrodeionization device as described in the present invention (packed mixed bed ion exchange strata coupled with separate anion and cation strata) enables an electrodeionization device to more effectively deionize feed water.

The present invention provides a number of important advantages by providing an electrodeionization apparatus with diluting compartments containing ion exchange material which is adapted to create improved interfacial contact between anion exchange and cation exchange materials while providing improved conduction paths for migration of anions and cations from regions distal from the respective ion exchange membranes to such ion exchange membranes.

In this respect, the ion exchange material includes a porous phase of mixed bed ion exchange material which has characteristically high interfacial contact between anion exchange and cation exchange materials. By providing such interfacial contact, this mixed bed phase promotes efficient removal of ionic impurities in the stream flowing through the diluting compartment. Further, the mixed bed phase facilitates ionization of water into hydrogen and hydroxyl ions for regeneration of anion and cation exchangers. Such regeneration is particularly beneficial in regions where the concentration of ions in a stream flowing through a diluting compartment is relatively low and, by themselves, is insufficient to sustain the applied current at a sufficiently high level for effective deionization of the stream flowing through the diluting compartment.

The mixed bed ion exchange phase is in contact with a porous phase of anion exchange material and/or a porous phase of cation exchange material. In the case of the anion exchange phase, such contact facilitates the migration of anions absorbed in the mixed bed phase to the anion exchange membrane. Interfacial contact between the anion exchange material in the anion exchange phase and anion exchange material in the mixed bed phase mitigates electrical resistance to the migration of anions absorbed in the mixed bed phase to the anion exchange membrane provided by oppositely charged ions within the diluting compartment. This is because such interfacial contact provides a conduction path for migration of absorbed anions from the mixed phase, across the anion exchange phase, and to the anion exchange membrane.

Similarly, in the case of the cation exchange phase, such interfacial contact facilitates the migration of cations absorbed in the mixed bed phase to the cation exchange membrane. Interfacial contact between the cation exchange material in the cation exchange phase and cation exchange material in the mixed bed phase mitigates electrical resistance to the migration of cations absorbed in the mixed bed phase to the cation exchange membrane provided by oppositely charged ions within the diluting compartment. This is because such interfacial contact provides a conduction path for migration of absorbed cations from the mixed phase, across the cation exchange phase, and to the cation exchange membrane.

It will be understood, of course, that modifications can be made in the embodiments of the invention described herein without departing from the scope and purview of the invention as defined by the appended claims.

We claim:

1. An electrodeionization unit for deionizing water having an anode compartment at one end of the unit and a cathode compartment at the other end, and a plurality of diluting compartments alternating with concentrating compartments between the said anode and cathode compartments, each of said diluting and concentrating compartments defined by anion and cation exchange membranes, each of said diluting compartments having ion exchange material, said ion exchange material comprising at least one mixed bed phase of anion exchange material and cation exchange material and at least one single phase, adjacent to the mixed bed phase, of anion exchange material or cation exchange material, or anion exchange material and cation exchange material.

2. The electrodeionization unit of claim 1 wherein said at least one single phase is contiguous to and abutting said anion and cation exchange membranes.

3. The electrodeionization unit of claim 2 in which said ion exchange material is under a compaction pressure of from 0.1 to 20 kg/cm$^2$.

4. The electrodeionization unit of claim 2 wherein said mixed bed phase and said at least one adjacent single phase are separate contiguous layers.

5. The electrodeionization unit of claim 4 wherein said layers are corrugated.

6. The electrodeionization unit of claim 1 wherein said at least one single phase is anion exchange material and wherein said anion exchange material is contiguous to and abutting said anion exchange membrane.

7. The electrodeionization unit of claim 1 wherein said at least one single phase is cation exchange material and said cation exchange material is contiguous to and abutting said cation exchange membrane.

8. The electrodeionization unit of claim 1 wherein said at least one single phase are anion exchange material and cation exchange material in layers and abutting a layer of mixed bed phase therebetween, said layers of anion exchange material and cation exchange material contiguous to and abutting the said anion exchange membrane and said cation exchange membrane respectively.

9. The electrodeionization unit of claim 8 wherein said mixed bed phase, said anion exchange single phase, and said cation exchange single phase are comprised of co-extensive layers.

10. The electrodeionization unit of claim 9 wherein said ion exchange material is under a pressure of from 0.1 to 20 kg/cm$^2$.

11. The electrodeionization unit of claim 1 wherein said at least one single phase is a porous and permeable continuous single phase and said mixed bed phase is a porous and permeable dispersed phase of clusters in the continuous single phase.

12. The electrodeionization unit of claim 11 wherein said ion exchange material is in the form of a shallow bed having opposite planar bed surfaces, and in which said dispersed phase clusters are perpendicular to the planar bed surfaces and are coterminous with at least one of said planar bed surfaces.

13. The electrodeionization unit of claim 11 wherein said dispersed phase clusters are perpendicular to the planar bed surfaces, extend through the shallow bed and are coterminous with the opposite planar bed surfaces of the said bed.

14. The electrodeionization unit of claim 1 wherein said mixed bed phase is a porous and permeable continuous phase and said at least one single phase is a porous and permeable dispersed phase of clusters of anion exchange material or cation exchange material in the continuous phase.

15. The electrodeionization unit of claim 14 wherein said ion exchange material is in the form of a shallow bed having opposite planar bed surfaces, and in which said dispersed phase clusters of anion exchange material or cation exchange material are perpendicular to the planar bed surfaces and are coterminous with at least one of said planar bed surfaces.

16. The electrodeionization unit of claim 15 wherein said dispersed phase clusters extend through the shallow bed and are coterminous with the opposite planar bed surfaces of the bed.

17. The electrodeionization unit of claim 1 wherein said at least one single phase is a porous and permeable continuous phase and said mixed bed phase is a porous and permeable dispersed phase of clusters of mixed bed ion exchangers.

18. The electrodeionization unit of claim 17 where said ion exchange material is in the form of a shallow bed having opposite planar surfaces, and in which said dispersed phase clusters are mixed bed ion exchangers perpendicular to the planar bed surfaces and are coterminous with at least one of said planar bed surfaces.

19. The electrodeionization unit of claim 18 wherein said dispersed phase clusters extend through the shallow bed and are coterminous with the opposite planar bed surfaces of the bed.

20. A method for deionizing water in an electrodeionization unit having an anode compartment at one end of the unit and a cathode compartment at the other end, and a plurality of diluting compartments alternating with concentrating compartments between the said anode and cathode compartments, each of said diluting and concentrating compartments defined by anion and cation exchange membranes, each of said diluting compartments having ion exchange material, said ion exchange material comprising at least one mixed bed phase of anion exchange material and cation exchange material and at least one single phase, adjacent to the said mixed bed phase, of anion exchange material or cation exchange material, or anion exchange material and cation exchange material, comprising passing feed water to be deionized through said diluting compartments.

21. The method of claim 20, additionally comprising applying a compaction pressure to the ion exchange material of 0.1 to 20 kg/cm$^2$.

22. A method as claimed in claim 21 in which said compaction pressure is applied by adjusting the volume of the ion exchange material in the free state to 103 to 170 volume % relative to the volume of the diluting compartments.

23. The method of deionizing water as claimed in claim 20 wherein said at least one single phase is adjacent to and abutting said anion and cation exchange membrane.

24. The method of deionizing water as claimed in claim 20 wherein said at least one single phase is anion exchange material and wherein said anion exchange material is adjacent to and abutting said anion exchange membrane.

25. The method of deionizing water as claimed in claim 20 wherein said at least one single phase is cation exchange material and said cation exchange material is adjacent to and abutting said cation exchange membrane.

26. The method of deionizing water as claimed in claim 20 wherein said at least one single phase are anion exchange material and cation exchange material in layers co-extensive and abutting a layer of mixed bed phase therebetween, said layers of anion exchange material and cation exchange material contiguous to and abutting the said anion exchange membrane and said cation exchange membrane respectively.

27. The method of deionizing water as claimed in claim 20 wherein said at least one single phase is a porous and permeable continuous single phase and said mixed bed phase is a porous and permeable dispersed phase of clusters in the continuous single phase.

28. The method of deionizing water as claimed in claim 27 wherein said ion exchange material is in the form of a shallow bed having opposite planar bed surfaces, and in which said dispersed phase clusters are perpendicular to the planar bed surfaces and are coterminous with at least one of said planar bed surfaces.

29. The method of deionizing water as claimed in claim 27 wherein said dispersed phase clusters are perpendicular to the planar bed surfaces, extend through the shallow bed and are coterminous with the opposite planar bed surfaces of the said bed.

30. The method of deionizing water as claimed in claim 20 wherein said mixed bed phase is a porous and permeable continuous phase and said at least one single phase is a porous and permeable dispersed phase of clusters of anion exchange material or cation exchange material in the continuous phase.

31. The method of deionizing water as claimed in claim 30 wherein said ion exchange material is in the form of a shallow bed having opposite planar bed surfaces, and in which said dispersed phase clusters of anion exchange material or cation exchange material are perpendicular to the planar bed surfaces and are coterminous with at least one of said planar bed surfaces.

32. The method of deionizing water as claimed in claim 31 wherein said dispersed phase clusters extend through the shallow bed and are coterminous with the opposite planar bed surfaces of the bed.

33. The method of deionizing water as claimed in claim 20 wherein said mixed bed phase and said adjacent phase are separate contiguous layers.

34. The method of claim 20, additionally comprising applying a compaction pressure to the ion exchange material of 0.8 to 2 kg/cm$^2$.

35. The method of claim 20, additionally comprising applying a compaction pressure to the ion exchange material of 0.5 to 10 kg/cm$^2$.

36. A method as claimed in claim 35 in which said compaction pressure is applied by adjusting the volume of the ion exchange material in the free state to 111 to 150 volume % relative to the volume of the diluting compartments.

37. A method for deionizing water in an electrodeionization unit having an anode compartment at one end of the unit and a cathode compartment at the other end of the unit, and a plurality of diluting compartments alternating with concentrating compartments between the said anode and cathode compartments, each of said diluting and concentrating compartments defined by anion and cation exchange membranes, each of said diluting compartments having ion exchange material, said ion exchange material comprising of at least one mixed bed phase, at least one anion exchange single phase, and at least one cation exchange single phase, said anion exchange phase and cation exchange phase being adjacent to said mixed bed phase, on opposite sides thereof, comprising passing feed water to be deionized through said diluting compartments.

38. The method of claim 37 additionally comprising applying a compaction pressure of 0.1 to 20 kg/cm$^2$ on said ion exchange material.

39. The method of deionizing water as claimed in claim 38 wherein said at least one single phase is adjacent to and abuts said anion and cation exchange membrane.

40. The method of deionizing water as claimed in claim 39 wherein said anion exchange single phase is adjacent to and abutting said anion exchange membrane and said cation exchange single phase is adjacent to and abutting said cation exchange membrane.

41. The method of deionizing water as claimed in claim 40 wherein said mixed bed phase, said anion exchange single phase, and said cation exchange single phase are comprised of separate co-extensive layers contiguous to and abutting the anion exchange membrane and the cation exchange membrane.

42. The method of claim 37 additionally comprising applying a compaction pressure of 0.5 to 10 kg/cm$^2$ on said ion exchange material.

43. The method of claim 37 additionally comprising applying a compaction pressure of 0.1 to 0.8 to 2 kg/cm$^2$ on said ion exchange material.

\* \* \* \* \*